United States Patent
Shibata et al.

(10) Patent No.: US 7,222,051 B2
(45) Date of Patent: May 22, 2007

(54) WORKING MACHINE, FAILURE DIAGNOSIS SYSTEM FOR WORK MACHINE AND MAINTENANCE SYSTEM FOR WORK MACHINES

(75) Inventors: Koichi Shibata, Niihari (JP); Hiroshi Watanabe, Ushiku (JP); Hiroshi Ogura, Ryugasaki (JP); Genroku Sugiyama, Ryugasaki (JP); Hiroyuki Adachi, Tsuchiura (JP); Hideo Karasawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 55 days.

(21) Appl. No.: 11/247,243

(22) Filed: Oct. 12, 2005

(65) Prior Publication Data

US 2006/0031042 A1 Feb. 9, 2006

Related U.S. Application Data

(62) Division of application No. 10/476,606, filed as application No. PCT/JP02/04262 on Apr. 26, 2002, now Pat. No. 7,079,982.

(30) Foreign Application Priority Data

May 8, 2001 (JP) .............................. 2001-137809
Jul. 19, 2001 (JP) .............................. 2001-219601

(51) Int. Cl.
*G06F 19/00* (2006.01)
(52) U.S. Cl. ...................... 702/184; 702/182; 702/183; 701/1; 701/99; 701/50
(58) Field of Classification Search ..................... None
See application file for complete search history.

(56) References Cited

U.S. PATENT DOCUMENTS

| | | | |
|---|---|---|---|
| 5,950,147 A * | 9/1999 | Sarangapani et al. ........ 702/179 |
| 6,119,074 A * | 9/2000 | Sarangapani ................. 702/185 |
| 6,330,499 B1* | 12/2001 | Chou et al. .................... 701/33 |
| 6,338,152 B1* | 1/2002 | Fera et al. ...................... 714/48 |
| 6,356,822 B1* | 3/2002 | Diaz et al. ..................... 701/33 |
| 6,427,101 B1* | 7/2002 | Diaz et al. ..................... 701/33 |
| 6,429,773 B1* | 8/2002 | Schuyler ................... 340/425.5 |

(Continued)

FOREIGN PATENT DOCUMENTS

JP A 7-18706 1/1995

(Continued)

*Primary Examiner*—Patrick J. Assouad
(74) *Attorney, Agent, or Firm*—Oliff & Berridge, PLC

(57) ABSTRACT

A working machine maintenance system having a plurality of working machines. A center server is provided that manages maintenance on the plurality of working machines by engaging in data exchange through bidirectional communication with each of the plurality of working machines via a communication line. The working machines each include an operation data storage device, an operation device operated to enter a maintenance work completion, a data transmission device, a data reception device, and a display device at which the maintenance information is displayed. The center server includes a data reception device that receives the operation data, the maintenance work completion data, and the maintenance data that have been transmitted, an operation database in which the operation data are stored, a maintenance database, a calculation device that calculates maintenance timing. and a data transmission device that transmits data related to the maintenance information.

2 Claims, 12 Drawing Sheets

U.S. PATENT DOCUMENTS

| | | | |
|---|---|---|---|
| 6,430,486 B1* | 8/2002 | Diaz et al. | 701/33 |
| 6,442,511 B1* | 8/2002 | Sarangapani et al. | 702/194 |
| 6,539,296 B2* | 3/2003 | Diaz et al. | 701/33 |
| 6,546,363 B1* | 4/2003 | Hagenbuch | 703/7 |
| 6,587,646 B2* | 7/2003 | Kikuchi et al. | 399/8 |
| 6,609,051 B2* | 8/2003 | Fiechter et al. | 701/33 |
| 6,778,893 B2* | 8/2004 | Murakami et al. | 701/50 |
| 6,803,861 B2* | 10/2004 | Flick | 340/989 |
| 6,816,815 B2* | 11/2004 | Takayama | 702/184 |
| 6,832,175 B2* | 12/2004 | Adachi et al. | 702/177 |
| 6,882,961 B2* | 4/2005 | Cobble et al. | 702/183 |
| 6,907,384 B2* | 6/2005 | Adachi et al. | 702/184 |
| 6,941,208 B2* | 9/2005 | Mahoney et al. | 701/50 |
| 6,954,689 B2* | 10/2005 | Hanson et al. | 701/33 |
| 2002/0001475 A1* | 1/2002 | Kikuchi et al. | 399/8 |
| 2002/0032507 A1* | 3/2002 | Diaz et al. | 701/33 |
| 2002/0032511 A1* | 3/2002 | Murakami et al. | 701/50 |
| 2002/0042670 A1* | 4/2002 | Diaz et al. | 701/33 |
| 2002/0103582 A1* | 8/2002 | Ohmura et al. | 701/33 |
| 2002/0107624 A1* | 8/2002 | Rutz | 701/33 |
| 2002/0116107 A1* | 8/2002 | Mahoney et al. | 701/50 |
| 2002/0156558 A1* | 10/2002 | Hanson et al. | 701/33 |
| 2003/0004624 A1* | 1/2003 | Wilson et al. | 701/33 |
| 2003/0069648 A1* | 4/2003 | Douglas et al. | 700/2 |
| 2003/0088347 A1* | 5/2003 | Ames | 701/33 |
| 2003/0093199 A1* | 5/2003 | Mavreas | 701/33 |
| 2003/0109972 A1* | 6/2003 | Tak | 701/29 |
| 2003/0114965 A1* | 6/2003 | Fiechter et al. | 701/29 |
| 2003/0115019 A1* | 6/2003 | Doddek et al. | 702/183 |
| 2003/0163440 A1* | 8/2003 | Tonack | 707/1 |
| 2004/0024502 A1* | 2/2004 | Squires et al. | 701/33 |
| 2004/0138790 A1* | 7/2004 | Kapolka et al. | 701/29 |
| 2004/0267418 A1* | 12/2004 | Sakurai et al. | 701/33 |
| 2005/0038579 A1* | 2/2005 | Lewis | 701/29 |
| 2005/0065682 A1* | 3/2005 | Kapadia et al. | 701/35 |
| 2005/0083196 A1* | 4/2005 | Furem et al. | 340/539.16 |
| 2005/0085973 A1* | 4/2005 | Furem et al. | 701/50 |
| 2005/0096810 A1* | 5/2005 | Mahoney et al. | 701/29 |
| 2005/0154500 A1* | 7/2005 | Sonnenrein et al. | 701/1 |
| 2005/0193252 A1* | 9/2005 | Cancilla et al. | 714/29 |

FOREIGN PATENT DOCUMENTS

| | | |
|---|---|---|
| JP | A 7-87005 | 3/1995 |
| JP | A 2000-259729 | 9/2000 |

* cited by examiner

WORKING MACHINE, FAILURE DIAGNOSIS SYSTEM FOR WORK MACHINE AND MAINTENANCE SYSTEM FOR WORK MACHINES

This is a Division of application Ser. No. 10/476,606 filed May 13, 2004 now U.S. Pat. No. 7,079,982, which is a National Stage of PCT/JP02/04262 filed Apr. 26, 2002. The entire disclosure of the prior applications is hereby incorporated by reference herein in its entirety.

INCORPORATION BY REFERENCE

The disclosures of the following priority applications are herein incorporated by reference:
Japanese Patent Application No. 2001-137809 filed May 8, 2001
Japanese Patent Application No. 2001-219601 filed Jul. 19, 2001.

TECHNICAL FIELD

The present invention relates to a failure diagnosis and maintenance performed on a working machine and, more specifically, it relates to a failure diagnosis and maintenance performed on a construction working machine such as a hydraulic excavator.

BACKGROUND ART

There are systems in the related art in which information (operation data) from construction working machines is transmitted to an information management center where operation data are used to forecast whether or not there is a failure (e.g., Japanese Laid-Open Patent Publication No. 2000-259729). The forecast information generated at the center is provided to the maintenance personnel and a maintenance person performs maintenance work or the like based upon the information thus provided.

However, in the system disclosed in the publication quoted above, the information from the center is not directly provided to the operator operating the working machine and, as a result, it takes a considerable length of time for the operator to ascertain the exact location of the failure and the cause of the failure in the working machine. This gives rise to a concern that when a failure occurs, the operator may not be able to take appropriate action in a timely manner.

In addition, failure repair data or maintenance completion data transmitted by the service personnel upon completing a repair on a failed machine or completing maintenance work are provided to a database at the center server through a manual input by the service personnel or a clerk in the office to which the service personnel report. Under certain circumstances, the data can be inadvertently left unentered or input erroneously. This, in turn, leads to a problem in that an unpredicted failure can occur through a failure to perform appropriate maintenance on the individual working machines.

DISCLOSURE OF THE INVENTION

The present invention provides a working machine, a failure diagnosis system for working machines and a maintenance system for working machines that provide an operator with appropriate information indicating a failure location in a working machine and the like and enable maintenance work to be performed on the working machine.

A working machine failure diagnosis method for performing a failure diagnosis by transmitting and receiving signals through communication devices provided at a working machine and at an information management center, according to the present invention, comprises: a first step in which a first signal related to a failure of the working machine is generated at the working machine and the first signal is transmitted to the information management center from the working machine via the communication devices; a second step in which, after the first signal is transmitted, the information management center generates a second signal for identifying a location of the failure based upon the first signal and the second signal is then transmitted from the information management center to the working machine via the communication devices; and a third step in which failure information corresponding to the first signal and the second signal is provided to an operator.

In this working machine failure diagnosis method, it is preferred that the first step starts upon a detection of an abnormal state at the working machine.

Also, it is preferred that the first step starts as an abnormality occurrence signal is input at the working machine when an abnormality has occurred at the working machine.

Also, it is preferred that there are further provided a fourth step in which a signal related to a service request for the identified failure location is transmitted from the working machine to the information management center, and a fifth step in which a servicing cost and a length of servicing time are calculated at the information management center based upon the signal related to the service request and information indicating the cost and the length of time is transmitted to the working machine.

Also, it is preferred that there are further provided a fourth step in which a signal related to a service request for the identified failure location is transmitted from the working machine to the information management center, and a fifth step in which a time point at which a service person is expected to arrive at a site is calculated at the information management center based upon the signal related to the service request and information indicating the time point is transmitted to the working machine.

A working machine failure diagnosis system according to the present invention comprises: a first signal generating device that generates at a working machine a first signal related to a failure of the working machine; a first transmission device that transmits the first signal from the working machine to an information management center; a second signal generating device that generates at the information management center a second signal for identifying a location of the failure based upon the first signal after the first signal is transmitted thereto; a second transmission device that transmits the second signal from the information management center to the working machine; and an informing device that provides an operator with failure information corresponding to the first signal and the second signal.

In this working machine failure diagnosis system, it is preferred that: the working machine includes a detection device that detects an abnormal state therein; and when an abnormal state is detected by the detection device, the first signal generating device generates the first signal based upon detection results.

Also, it is preferred that: the working machine includes an operating unit that is operated when an abnormality occurs therein; and when an abnormality occurrence signal is input through the operating unit, the first signal generating device generates the first signal based upon the abnormality concurrence signal.

Also, it is preferred that: the second signal contains information for identifying the failure location; and the informing device informs the operator of the identified failure location. In this case, it is preferred that: the information management center includes a service management device that calculates a servicing cost and a length of servicing time after a signal related to a service request is transmitted from the working machine following identification of the failure location; and the second signal generating device generates the second signal that contains information indicating the servicing cost and length of servicing time. Also, it is preferred that: the information management center includes a schedule management device that calculates a time point at which a service person is expected to arrive at a site after a signal related to a service request is transmitted from the working machine following identification of the failure location; and the second signal generating device generates the second signal that contains information indicating the arrival time point.

A working machine according to the present invention comprises: a signal generating device that generates a signal related to failure information; a transmission device that transmits the signal which has been generated to an information management center; a reception device that receives a signal related to a failure diagnosis returned from the information management center in response to the signal transmitted via the transmission device; and an informing device that provides failure information based upon the signal that has been received.

In this working machine, it is preferred that: there is further provided an automatic abnormality detection device that automatically detects an abnormal state in the working machine; and the signal generating process generates the signal related to the failure information when the abnormal state is detected by the automatic abnormality detection device.

Also, it is preferred that: there are further provided an input device through which a failure diagnosis instruction is received from an operator, and an abnormality detection device that detects whether or not an abnormal state is present in the working machine when the failure diagnosis instruction is received through the input device; and the signal generating process generates the signal related to the failure information when the abnormal state is detected by the abnormality detection device.

Also, it is preferred that: the signal generating device also generates a signal related to a service request for an identified failure location; the transmission device transmits the signal related to the service request to the information management center; the reception device receives a signal related to a servicing cost and a length of servicing time generated at the information management center based upon the signal related to the service request; and the informing device provides information related to the servicing cost and the length of servicing time based upon the signal related to the cost and the length of time which has been received.

Also, it is preferred that the signal generating device further generates a signal related to a service request for an identified failure location; the transmission device transmits the signal related to the service request to the information management center; the reception device receives a signal related to a time point at which a service person is expected to arrive at a site generated at the information management center based upon the signal related to the service request; and the informing device provides information related to the time point at which the service person is expected to arrive at the site based upon the signal related to the arrival time point which has been received.

A computer program product according to the present invention that can be read by a computer installed in a working machine, contains a working machine failure diagnosis program, and the working machine failure diagnosis program comprises: a signal generation instruction code for generating a signal related to failure information; a transmission instruction code for transmitting the generated signal to an information management center; a reception instruction code for receiving a signal related to a failure diagnosis returned from the information management center in response to the signal transmitted in conformance to the transmission instruction code; and an informing instruction code for providing failure information based upon the received signal.

An information management center according to the present invention that exchanges signals with a working machine comprises: a reception device that receives a signal related to failure information transmitted from the working machine; a signal generating device that generates a response signal related to a failure diagnosis in response to the signal; and a transmission device that transmits the response signal to the working machine.

A computer program product according to the present invention that can be read by a computer installed at an information management center engaged in signal exchange with a working machine, contains a working machine failure diagnosis program, and the working machine failure diagnosis program comprises: a reception instruction code for receiving a signal related to failure information transmitted from the working machine; a signal generating instruction code for generating a response signal related to a failure diagnosis in response to the signal; and a transmission instruction code for transmitting the response signal to the working machine.

A working machine maintenance system according to the present invention comprises: a plurality of working machines; and a center server that manages maintenance on the plurality of working machines by engaging in data exchange through bidirectional communication with each of the plurality of working machines via a communication line, and: the working machines each include an operation data storage device that stores operation data and maintenance data, an operation device operated to enter a maintenance work completion, a data transmission device that transmits the operation data, maintenance work completion data provided through the operation device and the maintenance data to the center server, a data reception device that receives data related to maintenance information transmitted from the center server and a display device at which the maintenance information is displayed; and the center server includes a data reception device that receives the operation data, the maintenance work completion data and the maintenance data that have been transmitted, an operation database in which the operation data are stored, a maintenance database in which the maintenance data are stored, a calculation device that calculates maintenance timing based upon the operation data stored in the operation database and the maintenance data stored in the maintenance database and a data transmission device that transmits data related to the maintenance information including the maintenance timing to a working machine.

In this working machine maintenance system, it is preferred that: maintenance work, a completion of which is signaled through an input operation at the operation device, includes failure repair work; and the maintenance data include failure location data indicating a failure location at the working machine.

A working machine according to the present invention comprises: a communication device that exchanges information via a communication line through bidirectional communication with a center server managing maintenance on a plurality of working machines; an operation device at which an input operation signaling a maintenance work completion is received; a storage device in which maintenance completion information related to the maintenance work completion is stored; and a control device that transmits the maintenance completion information stored in the storage device to the center server via the communication device when the input operation signaling the maintenance work completion is received at the operation device.

In this working machine, it is preferred that: there is further provided a display device; the control device receives maintenance instruction information related to a maintenance instruction transmitted from the center server via the communication line and displays the maintenance instruction information that has been received at the display device. In this case, it is preferred that operation information related to an operation of the working machine is stored in the storage device; and the control device transmits the operation information stored in the storage device to the center server via the communication device with predetermined timing.

A computer program product according to the present invention that can be read by a computer installed at a working machine, contains a working machine maintenance program, and the working machine maintenance program comprises: an operation instruction code for receiving an input operation signaling a maintenance work completion at the working machine via an input device; a storage instruction code for storing maintenance completion information related to the maintenance work completion at the working machine into a storage device; and a transmission instruction code for transmitting the maintenance completion information stored in the storage device via a communication device to a center server managing maintenance on a plurality of working machines upon receiving the input operation signaling the maintenance work completion.

A center server according to the present invention that manages maintenance on a working machine, comprises: a communication device that exchanges information with a working machine via a communication line through bidirectional communication; a maintenance database in which information related to the maintenance on the working machine is stored; and a control device that receives maintenance completion information related to a maintenance work completion at the working machine transmitted from the working machine via the communication device and stores the received maintenance completion information into the maintenance database.

In this center server, it is preferred that: there is further provided an operation database in which operation information related to an operation of the working machine is stored; and the control device receives the operation information transmitted from the working machine via the communication line and stores the received operation information into the operation database. In this case, it is preferred that the control device generates maintenance instruction information related to a maintenance instruction for the working machine based upon the information related to the maintenance on the working machine stored in the maintenance database and the operation information related to the operation of the working machine stored in the operation database and transmits the maintenance instruction information that has been generated to the working machine via the communication device.

A computer program product according to the present invention that can be read by a center server managing maintenance on a working machine, contains a working machine maintenance management program, and the working machine maintenance management program comprises: a reception instruction code for receiving maintenance completion information related to a maintenance work completion at the working machine transmitted from the working machine via a communication device; and a storage instruction code for storing the maintenance completion information that has been received into a maintenance database.

It is preferred that each of the above computer program products is a recording medium having the working machine failure diagnosis program recorded therein. Or it is preferred that each of the above computer program products is a carrier wave on which the working machine failure diagnosis program is embodied as a data signal.

BEST MODE FOR CARRYING OUT OF THE INVENTION

First Embodiment

In reference to FIGS. 1~6, the first embodiment of the failure diagnosis system according to the present invention is explained.

Figure 1:
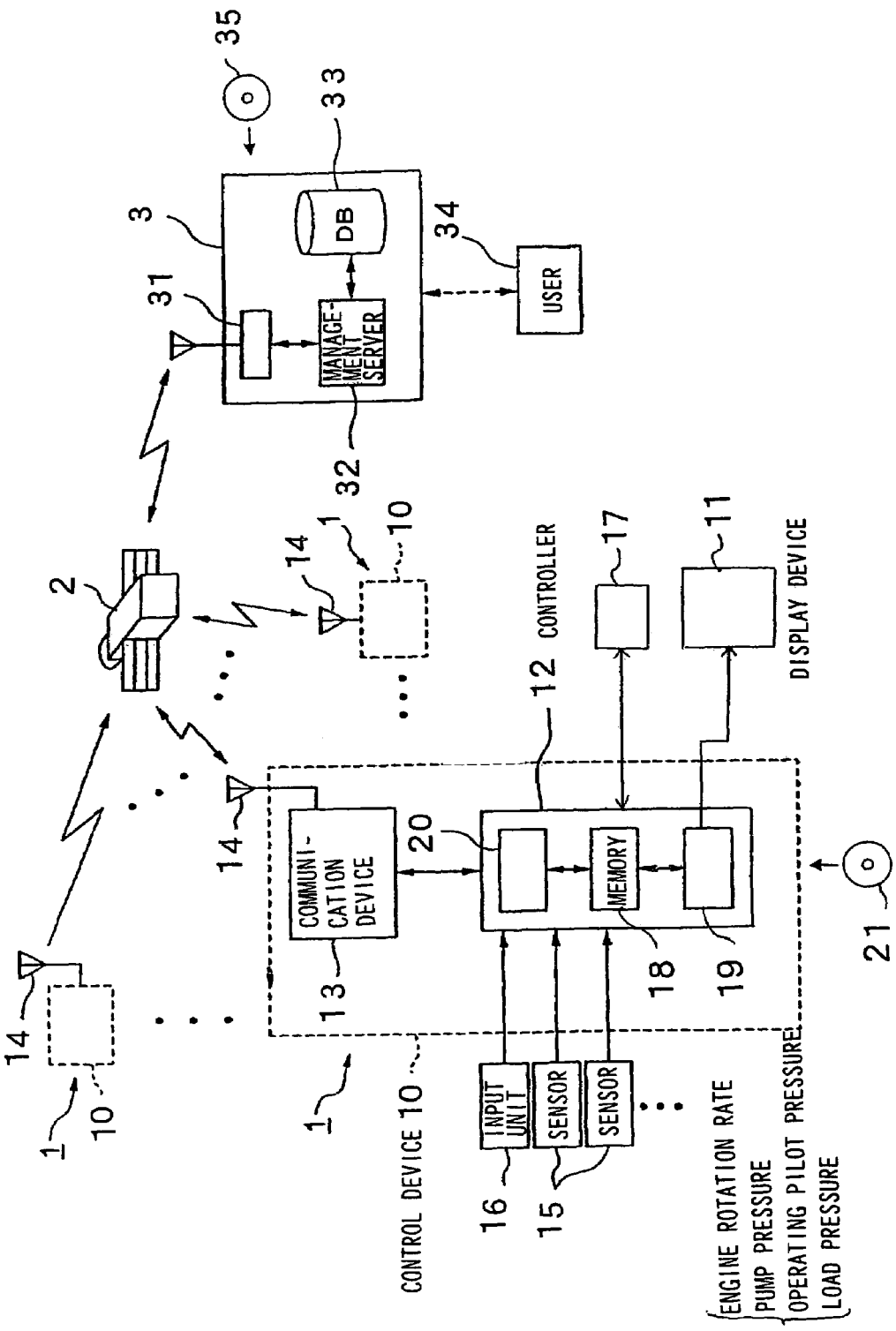
FIG. 1 is a schematic block diagram of the failure diagnosis system achieved in a first embodiment.
Figure 2:
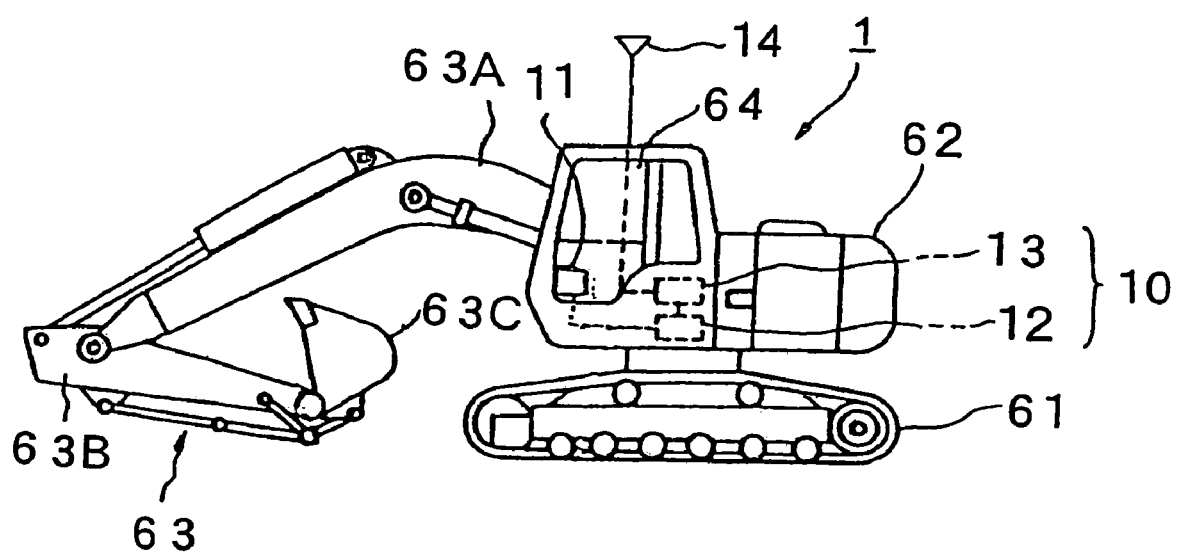
FIG. 2 is a side elevation of a hydraulic excavator in which the failure diagnosis system in the first embodiment may be adopted.

FIG. 1 is a schematic block diagram of the failure diagnosis system achieved in the first embodiment and FIG. 2 is a side elevation of a hydraulic excavator in which the failure diagnosis system may be adopted. As shown in FIG. 2, a hydraulic excavator 1 includes a traveling lower-structure 61, a swinging upper-structure 62 rotatably mounted on the traveling lower-structure 61 and a work device 63 comprising a boom 63A, an arm 63B and a bucket 63C supported from the swinging upper-structure 62. A control device 10 and a display device 11 such as a monitor are installed in an operator's cab 64. The control device 10 includes a controller 12 and a communication device 13 to which an antenna 14 is connected. A plurality of such hydraulic excavators 1 are deployed on the ground and they exchange information with a center 3 via a communication satellite 2 as shown in FIG. 1.

Numerous sensors 15 are provided at the hydraulic excavator 1 to detect the engine rotation rate, the hydraulic pump pressure level, the pilot pressure level set in response to an operation of an operating lever, the level of the load applied to an actuator which may be, for instance, a hydraulic cylinder and the like. A command for a signal transmission to the center 3, a command for image display at the display device 11 and the like are input through the operator's key operations or the like at an input unit 16. A warning generator 17 generates a warning based upon a signal provided by a sensor 15 to alert the operator that an abnormality has manifested in the hydraulic excavator.

Signals from the sensors 15, the input unit 16 and the communication device 13 are input to the controller 12 and are stored in a memory 18. The controller 12 includes a display control unit 19 and a transmission control unit 20. The display control unit 19 controls the image display at the display device 11, as shown in, for instance, FIG. 6 which is to be detailed later by using the signals from the input unit 16 and the communication device 13. The controller 12 creates transmission data based upon the signals stored in the memory 18 and transmits the transmission data thus prepared to the center 3 with predetermined timing through the processing (see FIG. 3) which is to be explained later.

The transmission data created at the controller 12 includes ID data used to identify the model type and the unit number of the hydraulic excavator 1, data indicating the date of operation and the operating hours of the hydraulic excavator 1, details of warning generation, the frequency distributions of the output values from the individual sensors relative to the engine rotation rate, details of parts replacement and details of failures. An abnormality signal provided by a sensor 15 enables a detection as to whether or not a failure has occurred. The failure details indicate various abnormalities such as an abnormal voltage output from a sensor 15, an abnormal engine rotation rate, an abnormal hydraulics pressure level, an abnormal battery charge and an abnormal cooling water temperature, which are provided as coded data. For instance, a failure code "1" is transmitted in the event of a failure at the boom angle sensor, a failure code "2" is transmitted in the event of a failure at an arm angle sensor and a failure code "3" is transmitted in the event of a failure at an electromagnetic valve.

These transmission data are received at a communication device 31 of the center 3 via the communication satellite 2 and are then transferred to a management server 32 at the maker to be stored into a database 33. The management server 32 recognizes any failure in the hydraulic excavator 1 through the processing (see FIG. 4) to be detailed later and transmits specific information to the hydraulic excavator 1. At the database 33, the transmission data from the hydraulic excavator 1 are cumulatively stored in correspondence to the individual machine numbers and model types. This makes it possible to keep track of the total length of operating time and the lengths of time over which the various parts have been used for each excavator. In addition, a failure diagnosis procedure for identifying a failure location and the cause of the failure in correspondence to a given failure code is stored in memory at the database 33.

A user's terminal 34 is connected to the center via, for instance, a telephone line. Thus, the user is able to exchange necessary information with the center 3. It is to be noted that the user may be a service department or a dealer of the hydraulic excavator maker and the failure information can be transmitted to the nearest service engineer as well.

Figure 3:
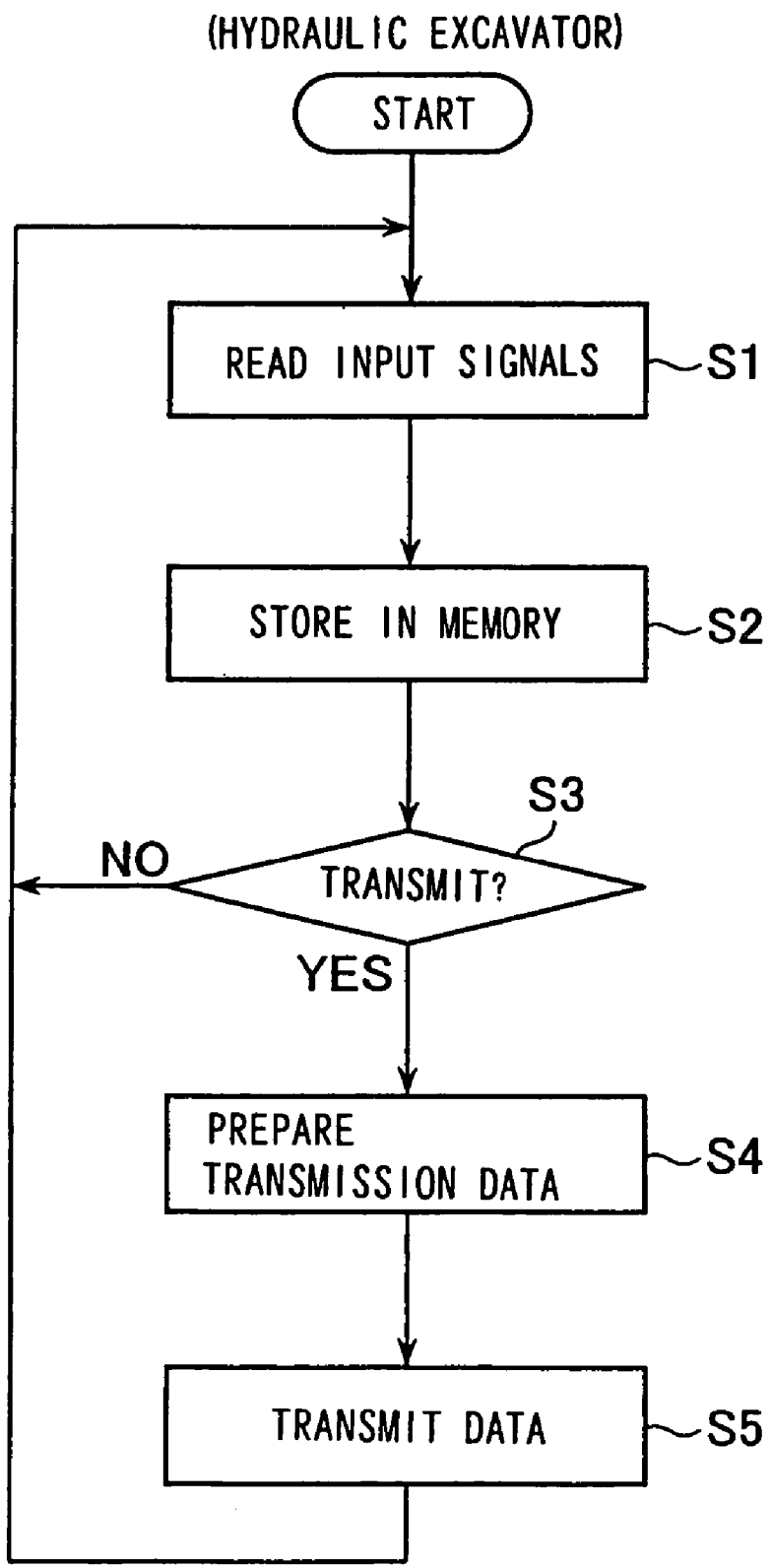
FIG. 3 presents a flowchart of an example of the information transmission/reception processing that may be executed in the controller of the hydraulic excavator in the first embodiment.
Figure 4:
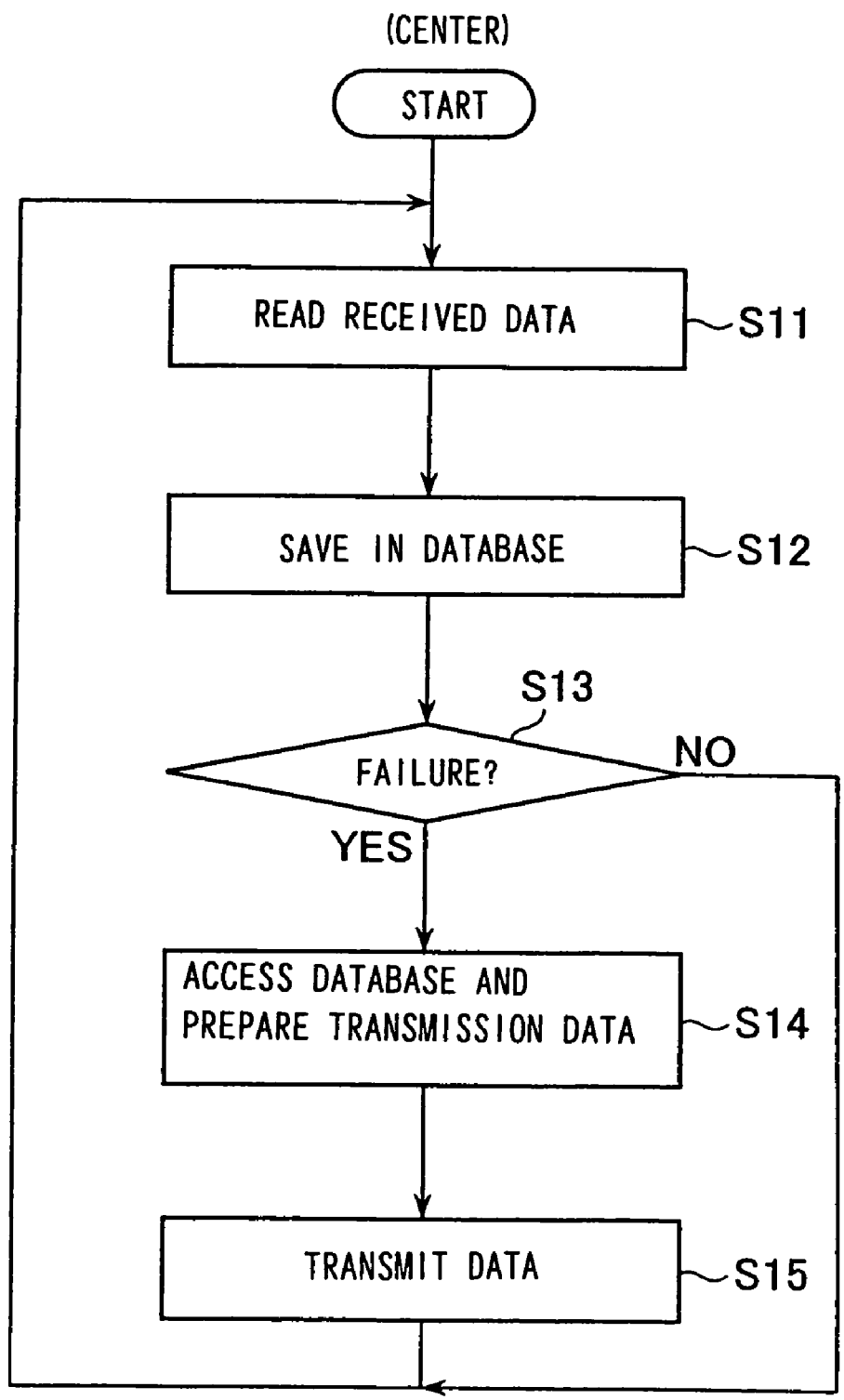
FIG. 4 presents a flowchart of an example of the information transmission/reception processing executed in the center server in the first embodiment.

Now, a specific example of the information transmission/reception processing is explained in reference to the flowcharts presented in FIGS. 3 and 4. It is to be noted that FIG. 3 shows the processing executed at the transmission control unit 20, whereas FIG. 4 shows the processing executed at the server 32. These processing programs are stored in a storage device (not shown) within the transmission control unit 20 and a storage device (not shown) at the server 32.

As shown in FIG. 3, the signals input from the sensors 15, the input unit 16 and the communication device 13 are read in step S1 and these input signals are stored into the memory 18 in step S2. Next, a decision is made as to whether or not a transmission command has been issued in step S3. A transmission command is output over predetermined time intervals following the work start or in response to an operation of the input unit 16 by the operator. It is to be noted that a transmission command may be output at the completion of the work or at a predetermined time point during the day (e.g., late at night). If an affirmative decision is made in step S3, the operation proceeds to step S4 to prepare the transmission data based upon the data stored in the memory 18, and the data thus prepared are transmitted in step S5 before the operation returns to step S1.

The data transmitted from the communication device 13 are received at the communication device 31 at the center 3. As shown in FIG. 4, the received data are read at the server 32 in step S11, and the data are then saved into the database 33 in step S12. Next, in step S13, a decision is made as to whether or not a failure has occurred by checking for failure codes and if an affirmative decision is made, the operation proceeds to step S14, whereas if a negative decision is made, the operation returns to step S11. In step S14, the database 33 is accessed and transmission data corresponding to the failure code and the received data are prepared. An example of these transmission data is to be explained later in reference to FIG. 6. Then, the transmission data are transmitted in step S15 before the operation returns to step S11.

Next, the operation of the failure decision-making device that characterizes the first embodiment is explained in further detail. It is to be noted that the following explanation is given on the assumption that the boom angle sensor has output an abnormality signal.

Figure 5:
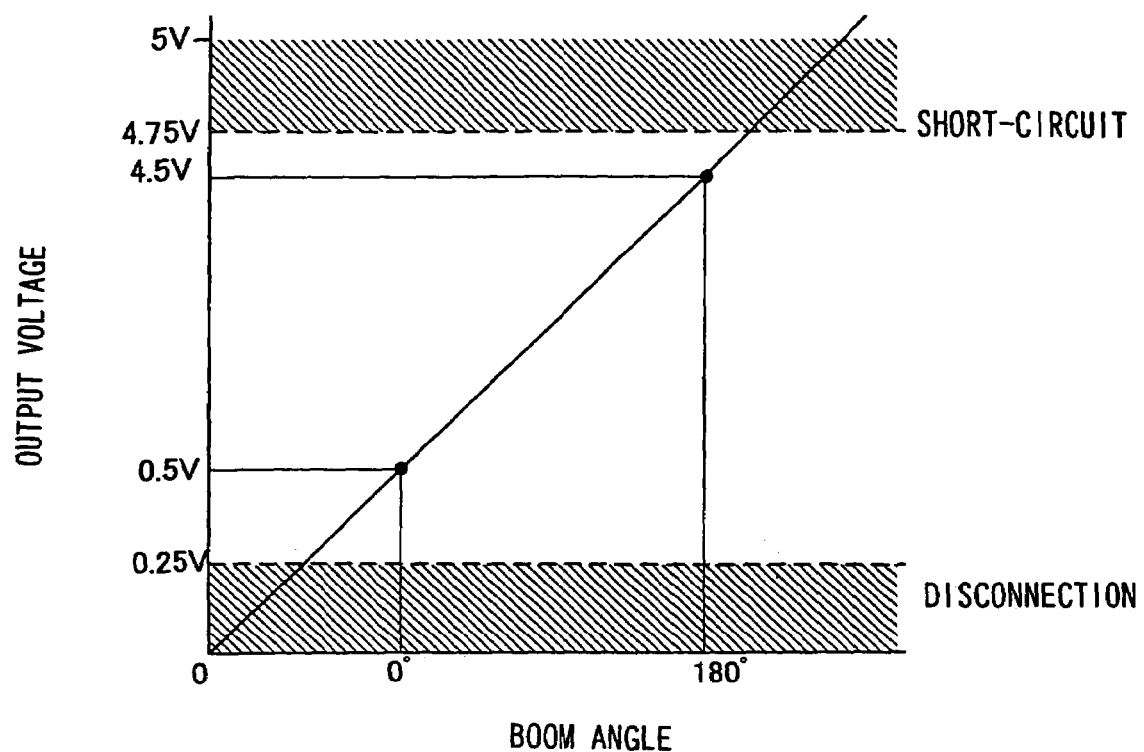
FIG. 5 is a diagram of the characteristics of a boom angle sensor.

FIG. 5 is a diagram of the characteristics of the boom angle sensor 15. When the sensor 15 is engaged in normal operation, the output voltage fluctuates within the range of 0.5V~4.5V in correspondence to the boom angle. If the output voltage level becomes equal to or lower than 0.25V or equal to or higher than 4.75V (the shaded areas) the controller 12 judges that an abnormality has occurred in the sensor output value due to disconnection or shorting. In this case, the failure location (the cause of the failure) may be the sensor 15 itself, the harness, the power source, the controller 12 or the like. Accordingly, a failure diagnosis is executed to as explained below to identify the exact failure location.

Figure 6:
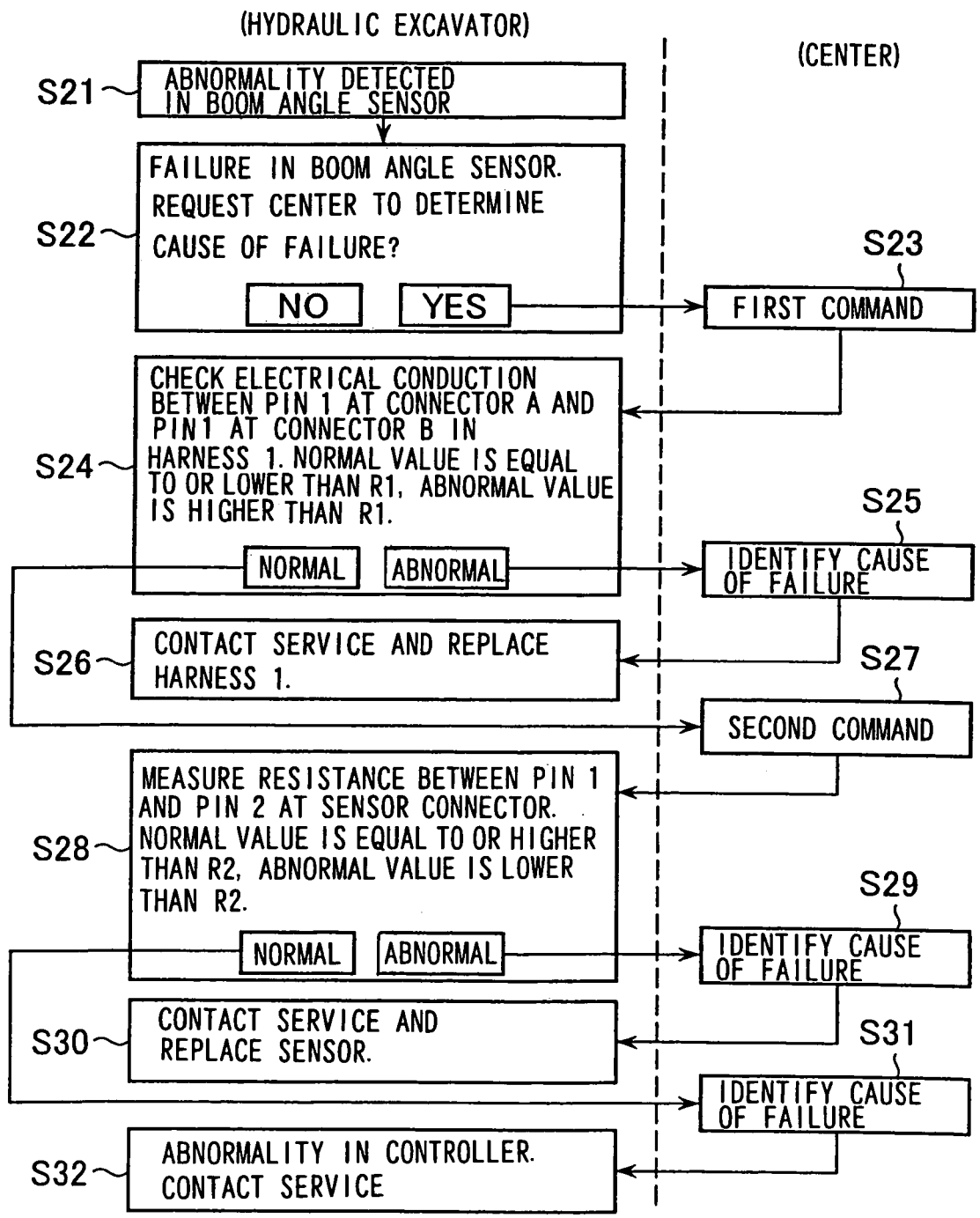
FIG. 6 presents a flowchart of a specific procedure followed in the signal transmission/reception in the failure diagnosis system in the first embodiment.

FIG. 6 shows a specific procedure which is taken in the signal transmission/reception between the hydraulic excavator 1 and the center 3. As the boom angle sensor 15 outputs an abnormality signal (step S21), the warning generator 17 generates a warning and, at the same time, the display control unit 19 generates a control signal to bring up a display of a question as to whether or not a failure diagnosis is to be executed at the display device 11, as shown in the figure (step S22). If the operator selects "yes" through an operation of the input unit 16 in response to this question, the transmission data (failure data) are transmitted to the center 0.3 together with the failure code "1" through the processing explained earlier (step S3->step S4->step S5). It is to be noted that depending upon the seriousness and the details of the failure, the failure data may be forcibly transmitted to the center 3 regardless of whether the operator selects "yes" or "no".

At the server 32, the database 33 is accessed through the processing described earlier (step S13->step S14->step S15), the failure diagnosis procedure corresponding to the failure code "1" is read and a first command is transmitted to the hydraulic excavator 1 (step S23). In response to this signal, an electrical conduction check command is brought up on display at the display device 11, as shown in the figure (step S24). The operator checks the state of electrical conduction at the harness connector by following the instruction on display to verify whether or not the state of electrical conduction is normal. If "abnormal" is selected through an operation of the input unit 16, the server 32 accesses the database 33, identifies the cause of the failure by using the transmitted information and sends information indicating the identified cause to the excavator 1 (step S25) As a result, information such as that shown in the figure is brought up on display at the display device 11 (step S26) so that the operator is able to identify the cause of the failure detected in the sensor 15 as a harness malfunction.

If, on the other hand, "normal" is selected through an operation of the input unit 16 in step S24, the server 32 transmits a second command to the excavator 1 (step S27). In response to this signal, a display of a resistance value measurement command is brought up at the display device 11 as shown in the figure (step S28). The operator follows this instruction and measures the resistance value at the connector of the sensor 15 to verify whether or not the resistance value is in the normal range. Then, if "abnormal" is selected, the server 32 accesses the database 33 to identify the cause of the failure and sends information indicating the identified cause to the excavator 1 (step S29). As a result, information such as that shown in the figure is brought up on display at the display device 11 (step S30) so that the operator can identify the failure as a malfunction in the sensor 15 itself.

If "normal" is selected in step S28, the server 32 accesses the database 33, identifies the cause of the failure based upon the accumulated information and sends information indicating the identified caused to the excavator 1 (step S31).

In this case, the cause of the failure is judged to be a malfunction of the controller 12 and information indicating the cause is brought up at the display device 11 as shown in the figure (step S32). Through the processing described above, the location of the failure can be identified in the event of an abnormality detected in the boom angle sensor.

It is to be noted that while an explanation is given above on an example in which a-failure diagnosis is executed for the boom angle sensor 15, a failure diagnosis can be executed in a similar manner for an electromagnetic proportional valve as well. In the latter case, if the value which is actually detected is equal to or higher than 3 MPa when the command value for the electromagnetic proportional valve driven by an electric lever is, for instance, equal to or lower than 1 MPa, it may be judged that a failure has occurred in the electromagnetic proportional valve and the failure code "3" may be transmitted accordingly. Then, in response to a command issued by the server 32, the operator should take an appropriate action such as checking the state of electrical conduction at the harness.

As described above, when the first embodiment, in which signals are exchanged between the hydraulic excavator 1 and the server 32 via the communication satellite 2 and information with regard to a failure at the excavator 1 is displayed at the display device 11 in a dialog format is adopted, the operator is able to ascertain the location of the failure with ease. As a result, the operator is able to take appropriate post-failure action. In addition, since a failure diagnosis is started in response to the output of an abnormality signal from a sensor 15, the failure diagnosis is performed in a timely manner. Furthermore, since the server 32 accesses the database 33 to identify the location of the failure, it is not necessary to store in memory a large volume of data at the excavator and thus, it is possible to utilize the available storage capacity at the excavator in an efficient manner. Moreover, the failure data are coded and thus, the data structure is simpler.

Second Embodiment

Figure 7:
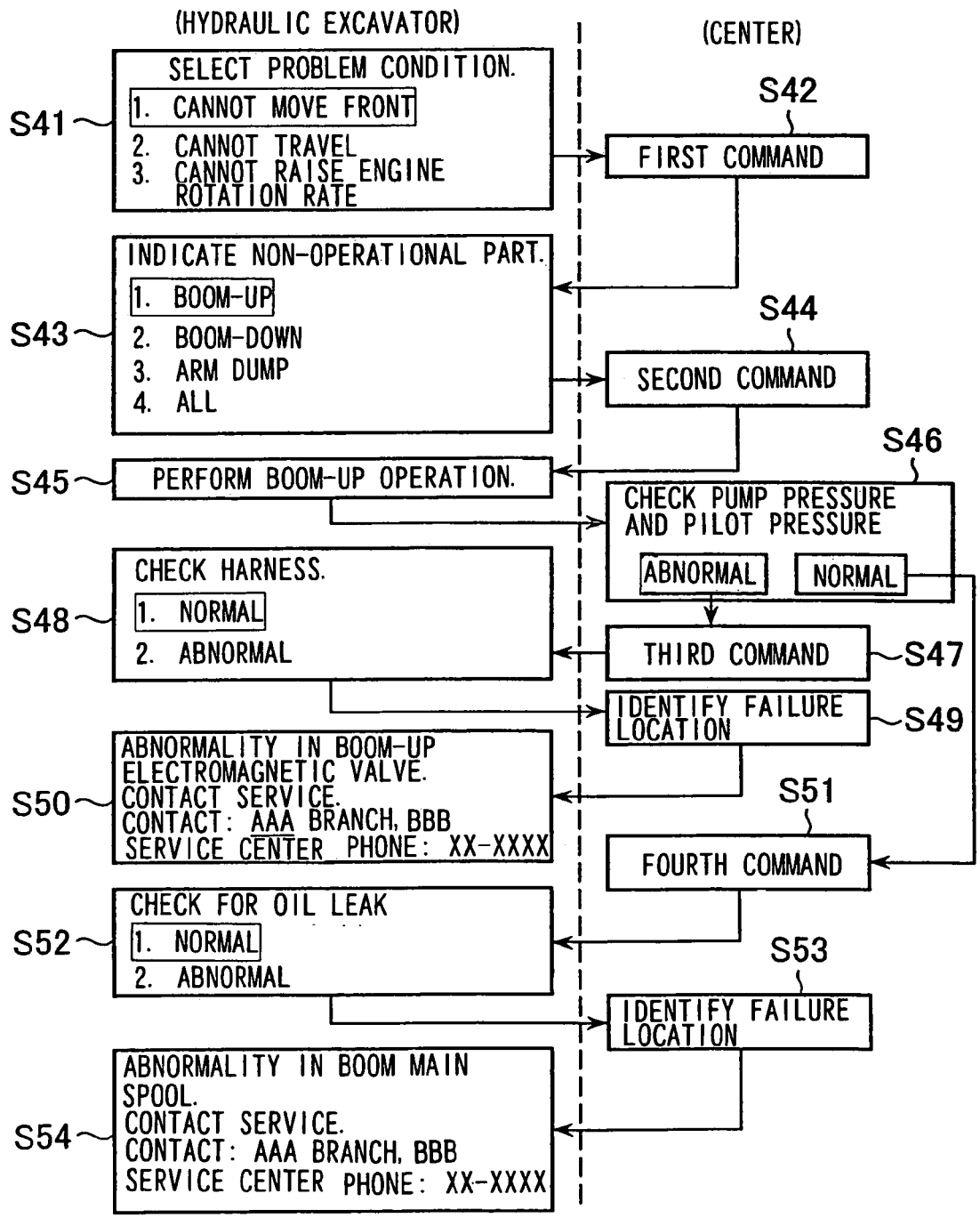
FIG. 7 presents a flowchart of a specific procedure followed in the signal transmission/reception in the failure diagnosis system achieved in a second embodiment.
Figure 8:
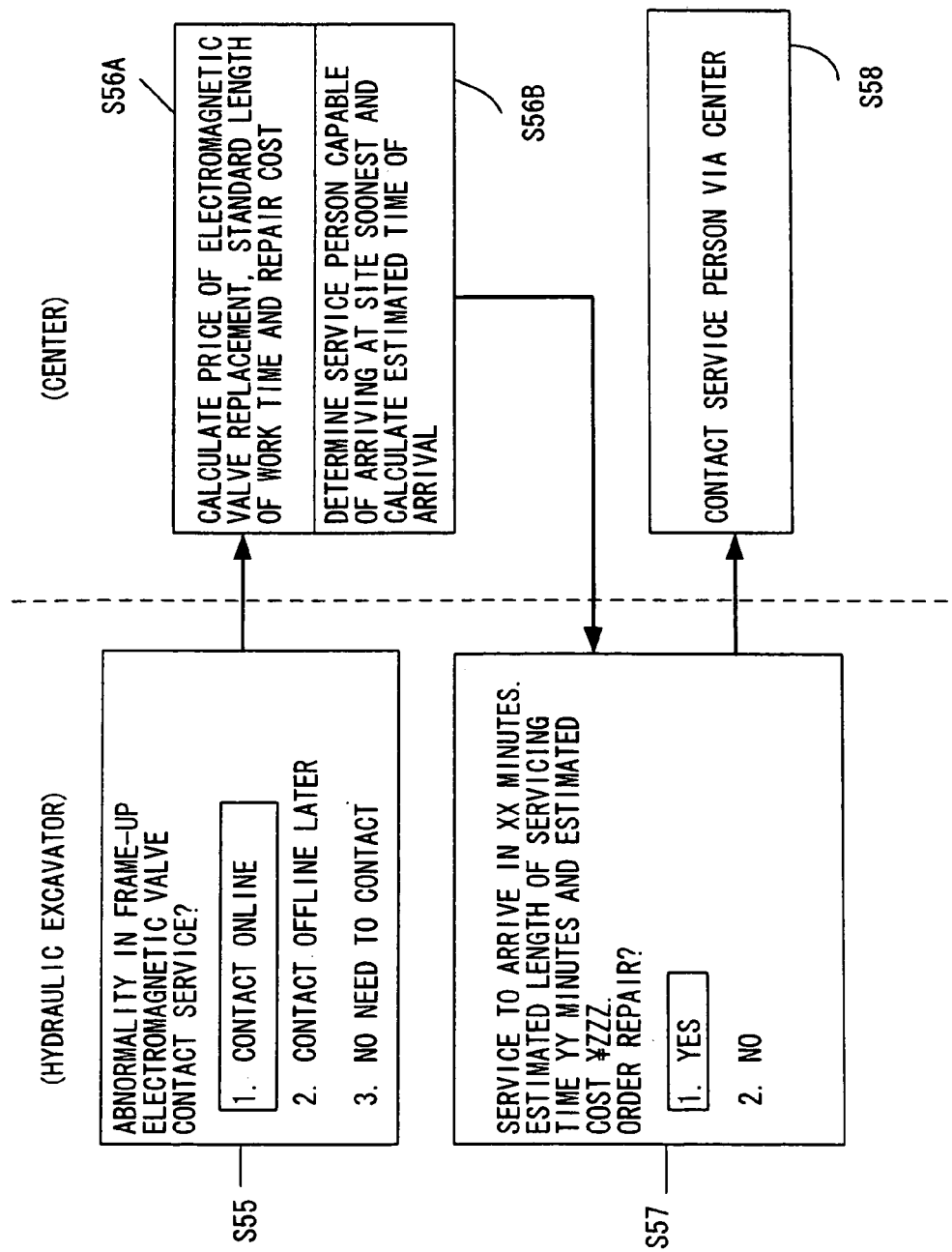
FIG. 8 presents a flowchart of an example of a variation of the procedure shown in FIG. 7.

The second embodiment of the present invention is now explained in reference to FIGS. 7 and 8. While the image displayed at the display device 11 is automatically switched in the event of a failure at a sensor 15 and the operation enters the failure diagnosis mode in the first embodiment, the operation enters the failure diagnosis mode in response to a menu selection operation performed by the operator in the second embodiment. The following explanation focuses on the difference from the first embodiment.

The second embodiment differs from the first embodiment in the specific procedure followed in the signal to transmission/reception between the hydraulic excavator 1 and the center 3. If any problem occurs while driving the hydraulic excavator 1, the operator selects the failure diagnosis mode by operating the input unit 16. In response, an initial screen such as that shown in FIG. 7, for instance, is the brought up at the display device 11 (step S41). In this example, "not able to move the front" is selected from the display screen. At the database 33, the procedures corresponding to various selection signals are stored in advance, and the server 32 reads the procedure corresponding to the specific selection signal from the database 33 and transmits a first command to the excavator 1 (step S42). In response, a question such as that shown in the figure is brought up on display at the display device 11 (step S43).

If "boom-up" is selected as the answer to this question, the server 32 transmits a second command corresponding to the selection signal (step S44) and the command is displayed as shown in the figure at the display device 11 (step S45). As the operator performs a boom-up operation in response to this command, the values of the detected pump pressure and pilot pressure during the boom-up operation are transmitted to the server 32. The server 32 makes a decision as to whether or not the transmitted detection values are in normal ranges (step S46) and transmits a third command if detected values are in abnormal ranges, i.e., if they are much lower than the preset values. In response, the command is displayed as shown in the figure at the display device 11 (step S48). If the operator selects "normal" upon checking the harness in response to this command, the server 32 identifies the location of the failure based upon the accumulated information (step S49). As a result, the location of the failure and a service contact are brought up on display together as shown in the figure at the display device 11 (step S50).

If, on the other hand, it is decided in step S46 that the values of the detected pump pressure and pilot pressure are in the normal ranges, the server 32 transmits a fourth command (step S51) and the command is displayed at the display device 11 as shown in the figure (step S52). If the operator selects "normal" upon checking for any oil leak in response to this command, the server 32 identifies the location of the failure based upon the accumulated information (step S53). As a result, the location of the failure and a service contact are brought up on display together as shown in the figure at the display device 11 (step S54).

While the location of the failure and the service contact are displayed in step S50 and step S54 as described above, a service person may be contacted through a question and answer format as shown in FIG. 8, instead. For instance, after the location of the failure is identified as the electromagnetic valve, information such as that shown in FIG. 8 is brought upon display at the display device 11 (step S55). If "contact online" is selected at this point, the server 32 accesses the database 33 and calculates the price of the replacement electromagnetic valve, the length of the standard labor time and the corresponding repair fee (step S56A).

In this system, each service engineer enters his work schedule for the day in advance by using his own personal computer or the like, and the schedule information is transmitted to the center 3 where it is stored into the database 33. In addition, the hydraulic excavator 1 is mounted with a position measuring instrument such as a GPS unit and thus, information indicating the current position of the hydraulic excavator 1 is transmitted to the center 3 in real time. Based upon the information, the server 32 determines the closest service department to the work site and the service engineer who can most quickly be dispatched to the site and transmits information with regard to the service request to the service engineer via the service department or by bypassing the service department. The service engineer, in turn, sends a response to the information indicating whether or not he is able to provide his service and the estimated time of arrival at the work site to the server 32 (step S56B).

The information obtained in steps S56A and S56B is transmitted to the excavator 1 where the information is brought up on display at the display device 11 as shown in the figure (step S57). Accordingly, the operator verifies the length of the labor time, the fee and the like and makes a decision as to whether or not a repair order is to be placed. If "yes" (the repair is ordered) is selected in step S57, this command is relayed to the service engineer via the center and the service engineer is dispatched to the site (step S58).

As explained above, in the second embodiment in which the failure diagnosis mode is selected through a menu operation by the operator, the location where a problem has occurred can be identified any time at the operator's request. In the event of a failure, a service request can be issued through a selection operation by the operator carried out in a dialogue format and thus, he does not need to go through the traditional, time-consuming process of repair order placement. In addition, since information such as the parts price, the length of time required for the repair work and the estimated time of arrival of the service engineer becomes instantly available, the efficiency and the operability are improved.

It is to be noted that while the information regarding a failure in the hydraulic excavator 1 is displayed at the display device 11 to alert the operator in the embodiment, the operator may be provided with the information through an audio message instead. In addition, while signals are exchanged over a plurality of times between the hydraulic excavator 1 and the center 3 in the processing shown in FIGS. 6~8, signals may be transmitted once each from the hydraulic excavator 1 and the center 3 instead. While the present invention is adopted in conjunction with hydraulic excavators in the embodiment described above, it may instead be adopted in other construction machines.

Third Embodiment

Figure 9:
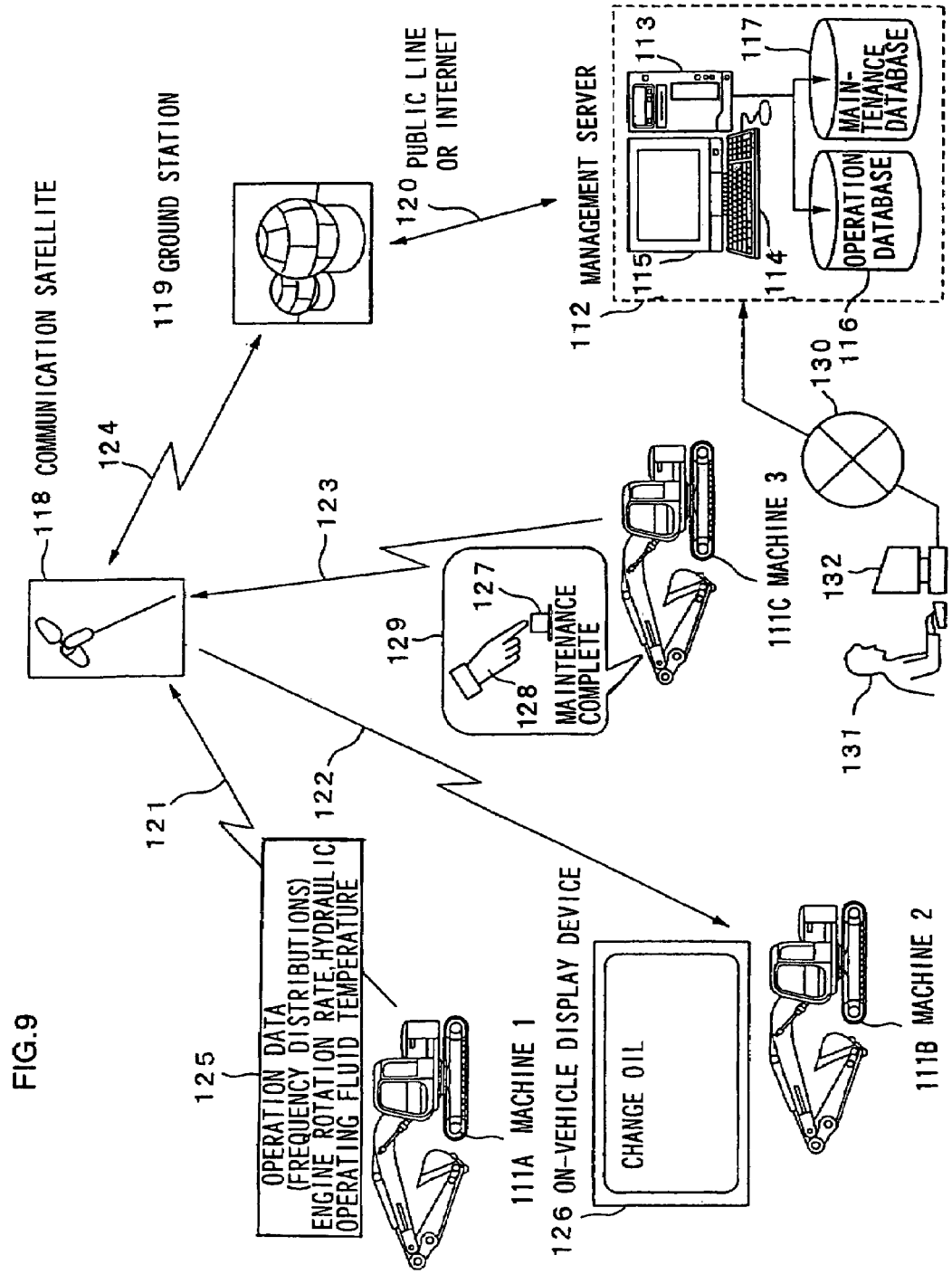
FIG. 9 a system block diagram showing the overall structure of the maintenance system for working machines achieved in a third embodiment.

FIG. 9 shows the overall structure of the maintenance system for working machines achieved in the third embodiment. Three hydraulic excavators 111A, 111B and 111C are shown in the figure as an example of working machines subscribing to the maintenance service. However, the maintenance work may be performed on working machines other than hydraulic excavators. While numerous hydraulic excavators are managed through this maintenance system for upkeep, management and maintenance in reality, only three hydraulic excavators 111A~111C, i.e., excavator 1, excavator 2 and excavator 3 are shown in the figure to simplify the explanation. These hydraulic excavators are assigned to individual work sites. The hydraulic excavators 111A~111C, which are managed through the maintenance system achieved in the embodiment as detailed later include maintenance monitor devices adopting structures identical to one another. The hydraulic excavators 111A~111C are each mounted with a control device constituted of a computer, and the control device includes a communication device, an operation control unit, an arithmetic processing unit, a storage unit and the like. These control devices enable the hydraulic excavators 111A~111C to exchange information with an external partner via an electrical communication line. The maintenance monitor devices mentioned earlier are each realized in the form of a control device adopting the structure described above.

A management server (or a center server) 112 is provided to manage the maintenance of the plurality of the hydraulic excavators 111A~111C. The management server 112 is installed at a base station, whereas the hydraulic excavators 111A~111C are assigned to work sites at remote locations. The management server 112 is operated by the maker, a rental company, a sales company, a maintenance management company or the like. The management server 112 comprises a computer 113, various types of input devices 114, a display device (display) 115, an operation database 116, in which operation data are stored, and a maintenance database 117, in which maintenance data (data on regular inspections, failure repair data, data on replacement of parts and consumables) are stored. The computer 113 at the management server 112 includes functional units such as the communication device and the arithmetic processing unit and exchanges information (commands, data and the like) with each of the hydraulic excavators 111A~111C at remote locations via the electrical communication line.

The electrical communication line (a data communication path) connects the hydraulic excavators 111A~111C with the management server 112. The electrical communication line is constituted of a communication satellite 118, a ground station 119 and a public line or the Internet 120. The hydraulic excavators 111A~111C and the management server 112 engage in bidirectional communication through their communication devices and also via the electrical communication line adopting the structure described above.

Arrows 121, 122, 123 and 124 in FIG. 9 indicate various states in which communication is in progress. However, these arrows simply represent an example.

The arrow 121 indicates a state in which operation data 125 are transmitted from the hydraulic excavator 111A to the management server 112 via the communication satellite 118, the ground station 119 and the like. The operation data 125, shown as a block of data, indicate the frequency distributions of the engine rotation rate, the hydraulic operating fluid temperature, the radiator water temperature, the pump pressure and the like at the hydraulic excavator 11A. The operation data 125, which are obtained at the control device through various operation sensors to ascertain the operating state of the hydraulic excavator 111A while it is engaged in work, are stored in the storage unit. The operation data are collected and saved at the maintenance monitor device mentioned earlier. The operation data are transmitted by the control device and the communication device at the hydraulic excavator 111A on a regular basis or as necessary to the management server 112 where they are recorded into the operation database 116.

The arrow 122 indicates a state in which a command related to maintenance is transmitted from the management server 112 to the hydraulic excavator 111B. The contents of this maintenance command are displayed as a message, e.g., "change oil", at an on-vehicle display device 126 provided inside the operators cab of the hydraulic excavator 111B. In FIG. 9, the on-vehicle display device 126 is shown in an enlargement for emphasis.

The arrow 123 indicates a state 129 in which a maintenance completion signal is transmitted to the management server 112 in response to an ON operation of a maintenance complete switch 127 at the hydraulic excavator 111C by a service engineer or operator 128. The service engineer performs maintenance work related to the items displayed at the on-vehicle display device 126, for instance, and presses the maintenance complete switch 127 when the work is completed. As a result, the length of operating time having elapsed up to the work completion and the maintenance work items are automatically transmitted to the management server 112 and the transmitted contents are recorded into the maintenance database 117 at the management server 112.

As described above, necessary data and commands are exchanged through the bidirectional communication between the individual hydraulic excavators 111A~111C assigned at the various work sites and the management server 112.

In addition, a user 131 can access the management server 112 via the Internet 130 by using an Internet terminal device 132. The user 131 is a party involved in the operation of one of the hydraulic excavators 111A~111C. The user 131 accesses the homepage of the management server 112 that provides maintenance information, receives permission for information access by entering his ID and password and obtains the maintenance information on the relevant hydraulic excavator or the like.

Figure 10:
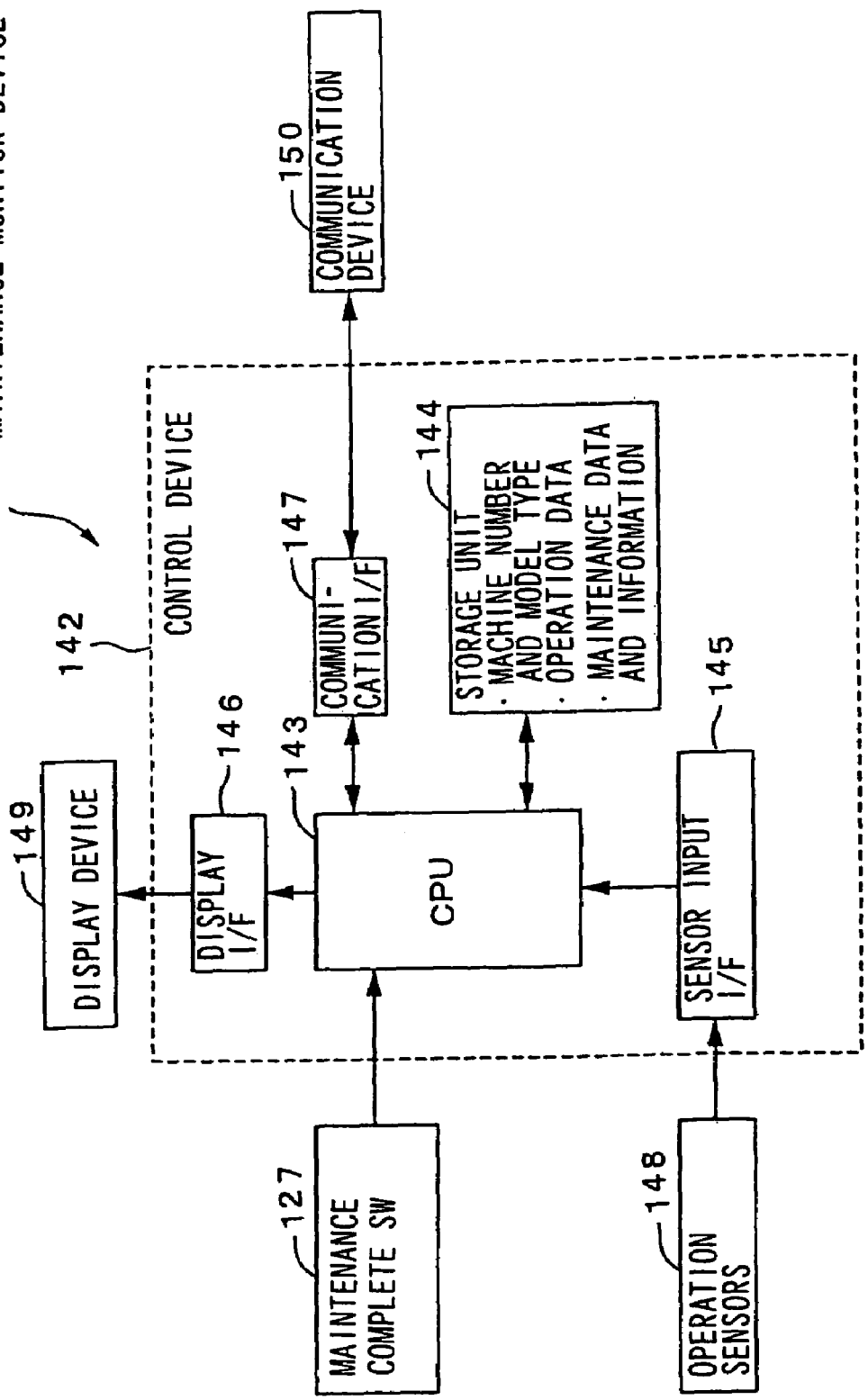
FIG. 10 is a block diagram of the maintenance monitor device mounted at the hydraulic excavator.

Now, in reference to FIG. 10, a specific structure that may be adopted in the maintenance monitor devices provided in the hydraulic excavators 111A~111C is explained.

A maintenance monitor device 141 is realized in the form of a control device 142 constituted of a computer. The control device 142 comprises a CPU 143, a storage unit (memory) 144, a sensor input interface (I/F) 145, a display interface (I/F) 146 and a communication interface (I/F) 147. Signals indicating the operating state of the hydraulic excavator detected by operation sensors 148 provided at the various mechanical components including the engine and the hydraulic fuel supply system are input to the CPU 143 via the sensor input interface 145. The CPU 143 stores operation data based upon the various operation signals input thereto into the storage unit 144. At the storage unit 144, a program and data which enable the execution of the various types of processing are stored. The data stored at the storage unit 144 include the data indicating the machine number and the model type, maintenance data and maintenance information in addition to the operation data described above. The maintenance complete switch 127 explained earlier is provided at the operator's cab of the hydraulic excavator. An ON operation signal generated at the maintenance complete switch 127 is input to the CPU 143. The control device 142 includes a display device 149. This display device 149 corresponds to the on-vehicle display device shown in FIG. 9. Display data are transmitted from the CPU 143 via the display interface 146 and maintenance related information is displayed at the screen of the display device 149. The maintenance monitor device 141 includes a communication device 150. The communication device 150 constitutes a data communication terminal. Various types of data are exchanged between the control device 142 and the management server 112 via the communication device 150. The communication device 150 is connected to the CPU 143 via the communication interface 147.

Details of the processing executed by the maintenance monitor device 141 adopting the structure described above are provided below in relation to the communication with the management server 112.

Figure 11:
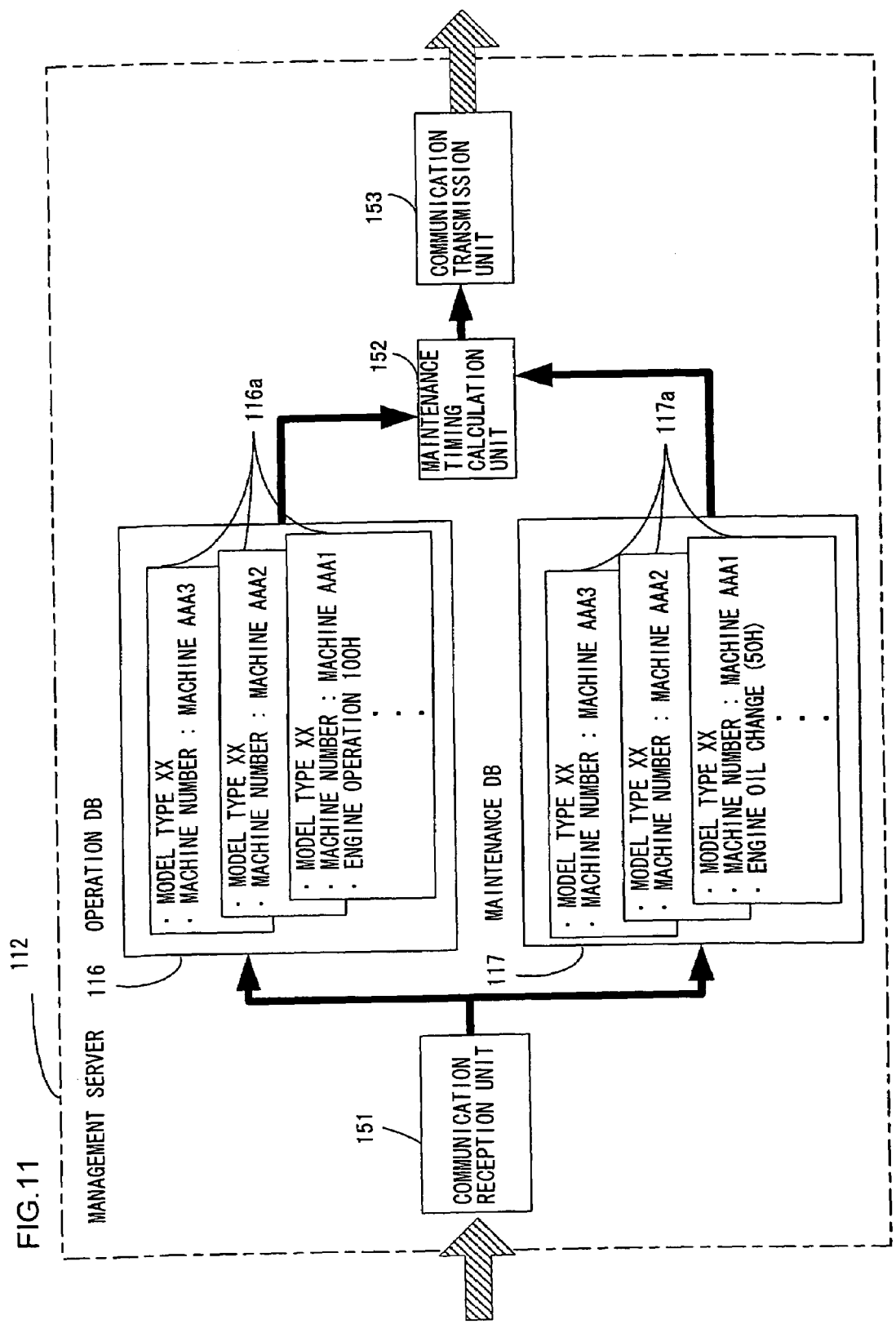
FIG. 11 is a block diagram showing the structure adopted in, and the processing executed in the essential part of the management server.

Next, in reference to FIG. 11, the structure of the management server 112 and the essential processing executed in the management server 112 are explained in detail. The management server 112 in FIG. 11 includes data storage units, i.e. the operation database (operation DB) 116 and the maintenance database (maintenance DB) 117, as described earlier. The various types of data transmitted from the hydraulic excavators 111A~111C to the management server 112 via the electrical communication line are received at a communication reception unit 151 of the management server 112. The operation data are then passed through the communication reception unit 151 and stored (recorded) in the operation database 116. In the operation database 116, each set of operation data is recorded as a file 116a corresponding to a specific machine number and model type. In addition, each set of maintenance data is recorded at the maintenance database 117 as a file 117a corresponding to a specific machine number and model type. The computer 113 of the management server 112 includes a maintenance timing calculation unit 152 as a functional means. The maintenance timing calculation unit 152 calculates the correct timing with which maintenance (repairs, parts replacement) should be performed on various parts (maintenance requiring parts) of the working machines in correspondence to the individual machine numbers a model types based upon maintenance criteria obtained through statistical processing of the operation data and the maintenance data from numerous hydraulic excavators. The data indicating the maintenance timing for each machine number and model type calculated at the maintenance timing calculation unit 152 are transmitted to the hydraulic excavator classified under the corresponding machine number and model type through a communication transmission unit 153 and then via the electric communication circuit explained earlier.

Figure 12:
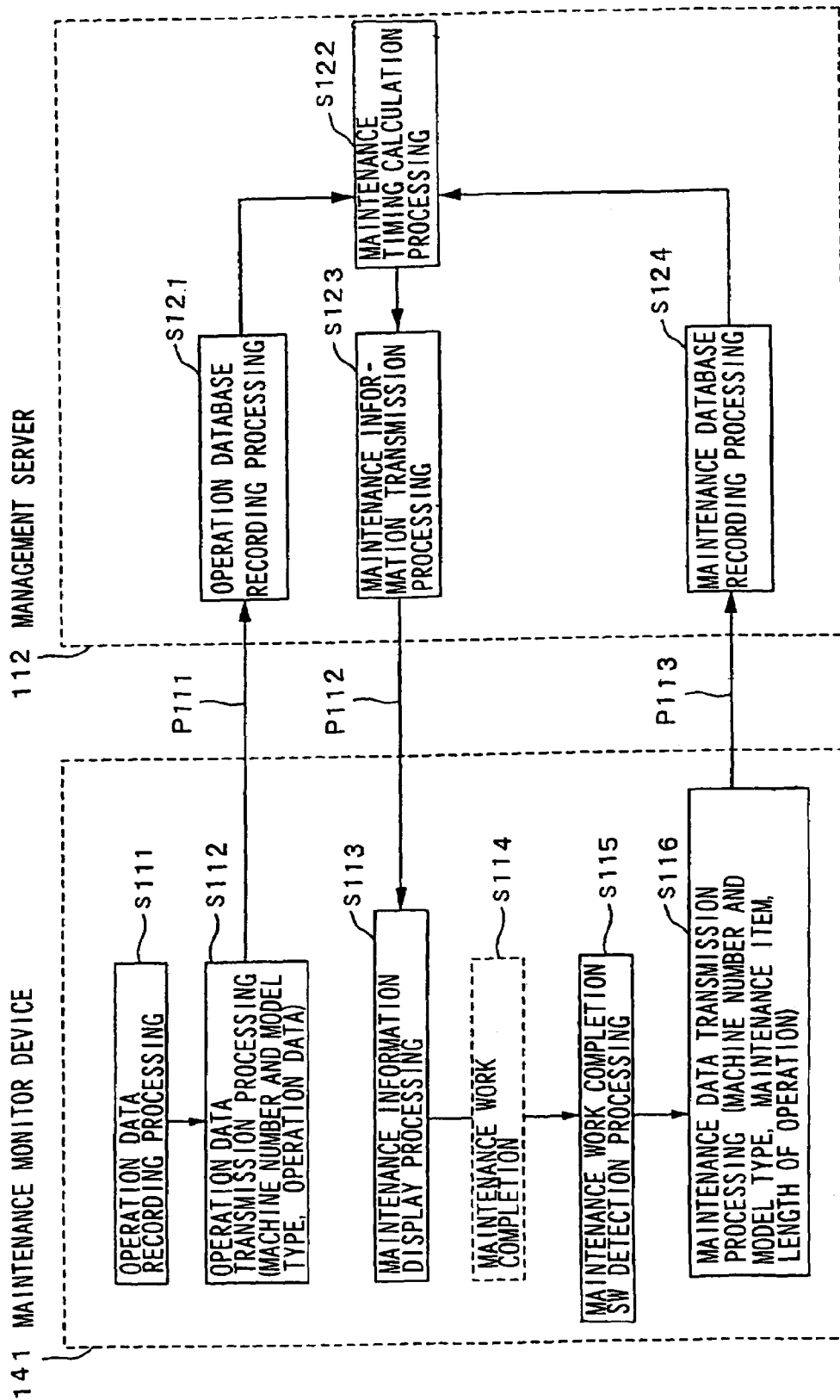
FIG. 12 presents a flowchart of the bi-directional data transmission between the maintenance monitor device at the hydraulic excavator and the management server.

Next, details of the data transmission/reception processing achieved through the bidirectional communication between the maintenance monitor device 141 provided at the individual hydraulic excavators 111A~111C and the management server 112 are explained. FIG. 12 presents a flowchart of the bidirectional data exchange between the maintenance monitor device of a hydraulic excavator and the management server. The programs for executing the processing are stored in advance at storage devices (not shown) within the maintenance monitor device 141 and the management server 112.

At each hydraulic excavator, its maintenance monitor device 141 stores with a predetermined timing the operation data indicating the operating state of the mechanical parts engaged in operation on a daily basis (step S111). In the operation data recording processing, the CPU 143 takes in operation signals via the various operation sensors 148 mentioned earlier and stores them as operation data into the storage unit 144. Information indicating the model type and machine number is appended to the operation data stored in the storage unit 144. As the operation data are accumulated over a specific length of time at the storage unit 144, the CPU. 143 executes processing for transmitting the operation data stored in the storage unit 144 to the management server 112 on a regular basis (e.g., every 100 engine operating hours) (step S112). The operation data are transmitted in response to the processing executed by the CPU 143 via the communication interface 147, the communication device 150 and the electrical communication line constituted of the communication satellite 118 and the like (through a transmission procedure P111). The operation data being transmitted are appended with the data indicating the model type and machine number of the corresponding hydraulic excavator.

Upon receiving the operation data transmitted from the maintenance monitor device 141 of the hydraulic excavator (through the transmission procedure P111) at the communication reception unit 151, the management server 112 stores the received operation data in correspondence to the model type and machine number into the operation data base 116 (step S121). Next, the maintenance timing calculation unit 152 calculates the maintenance timing for the individual maintenance-requiring parts by using a formula conforming to the predetermined criteria (step S122). During the maintenance timing calculation processing, the processing details recorded in the maintenance data base 117 are referenced for the calculation. Each set of maintenance timing data is calculated in correspondence to a given maintenance requiring part. The maintenance timing data obtained through the maintenance timing calculation processing (step S122) are transmitted as maintenance information to the maintenance monitor device 141 of the corresponding hydraulic excavator (step S123) via the communication transmission unit 153 together with a corresponding command (message). The maintenance information is transmitted from the management server 112 to the maintenance monitor device 141 through the electrical communication line mentioned earlier (through a transmission procedure P112).

At the maintenance monitor device 141, the maintenance information transmitted from the management server 112 is taken into the CPU 143 via the communication device 150 and the communication interface 147, and the CPU 143 displays the maintenance information at the display device 149 via the display interface 146 (step S113). An example of a display mode that may be assumed at the display device 149 is shown at the on-vehicle display device 126 of the hydraulic excavator 111B in FIG. 9.

Subsequently, a service engineer performs maintenance work on the hydraulic excavator in conformance to the maintenance information provided by the management server 112. Under normal circumstances, the operator of the hydraulic excavator checks the contents of the display brought up at the display device 149, verifies the items to be serviced and the timing of the maintenance and places a request to the service engineer (or a maintenance technician) for maintenance service. The service engineer performs the maintenance work as indicated at the display device 149 and once the maintenance work is completed (step S114), the service engineer turns on the maintenance complete switch 127 to signal work completion. In response to the ON operation of the maintenance complete switch 127, an ON signal is input to the CPU 143 and thus, the CPU 143 executes work complete switch detection processing (step S115). Following the work complete switch detection processing, the CPU 143 executes processing for transmitting the maintenance data to the management server 112 (step S116) During the maintenance data transmission processing, the data including the model type and machine number, the maintenance item and the length of operating time are read from the storage unit 144 and the data thus read out are transmitted to the management server 112 via the communication interface 147, the communication device 150 and the electrical communication line (through transmission procedure P113). At the management server 112, the maintenance data that have been received are recorded into the maintenance database 117. The recorded maintenance data are incorporated with the basic data for the next maintenance timing calculation processing (step S122) to be used for the next maintenance forecast calculation.

In the structure described above, a plurality of sets of maintenance information may be brought up on display at the display device 149 of the maintenance monitor device 141. In this case, maintenance work is performed in correspondence to each of the plurality of sets of maintenance information on display. An ON operation of the maintenance complete switch 127 to signal a work completion may be performed upon completion of each maintenance work operation or it may be performed upon completion of the entire series of maintenance work.

Failure repair work may be executed during the maintenance work the completion of which is signaled through the maintenance complete switch 127 in the structure described above, and accordingly, the maintenance data may contain failure location data indicating the location of a failure in the hydraulic excavator. When a failure occurs at the hydraulic excavator, requiring repair work other than the maintenance work which is executed as directed by the management server 112, information related to the failure repair can be transmitted to the management server 112 by using the maintenance complete switch 127 and the failure repair information can be recorded into the maintenance database.

The data exchange achieved through the bidirectional communication between the maintenance monitor device 141 and the management server 112 is performed individually between the each of the hydraulic excavators 111A~111C and the management server 112.

By adopting the third embodiment explained above, in which bidirectional communication is achieved between the center server and each of a plurality of working machines through the electrical communication line constituted of a communication satellite, the Internet and the like, a maintenance monitor device that collects maintenance data necessary for the maintenance management and stores the maintenance data in a storage unit is provided in each working machine and the maintenance data are automatically transmitted to the center server as an operating means for signaling a work completion is operated upon the completion of the maintenance work, the manual input operation normally performed by the service engineer or the like in the related art is eliminated and a higher degree of reliability is achieved through the automatic transmission of the maintenance data.

In addition, the center server, which prepares maintenance information indicating a specific maintenance-requiring part and maintenance timing for each working machine based upon the operation data and the maintenance data stored in the database and transmits the maintenance information thus prepared to the corresponding working machine to be referenced by the operator, is enabled to execute the maintenance work with reliability.

While an explanation is given above in reference to the embodiments on an example in which the present invention is adopted in conjunction with hydraulic excavators, the present invention is not limited to this example. The present invention may instead be adopted in conjunction with cranes or other types of construction working machines (construction machinery). In addition, the present invention may be adopted in conjunction with working machines other than construction working machines, as long the working machines are engaged in operation at work sites and a management center can be connected with the working machines through a communication line which enables bidirectional communication.

While an explanation is given above in reference to the embodiments on an example in which transmission/reception is achieved through a communication satellite, the application of the present invention is not restricted by these particulars. For instance, data transmission/reception may be achieved by using a mobile communication system such as a mobile telephone (a cellular phone) or a PHS telephone, or it may be achieved by using another wireless system as well.

While an explanation is given above in reference to the embodiments on an example in which the programs executed by the working machines and the management server at the center are stored in advance in the internal storage devices, the present invention is not limited to this example. For instance, the programs may be provided in recording media such as CD-ROMs 21 and 35 in FIG. 1. Alternatively, the programs may be provided by a program server connected via the Internet. Furthermore, the working machine program may be provided by the management server in FIG. 1 or FIG. 6. When the programs are provided via the Internet and a communication satellite, they should be embodied as data signals on carrier waves which are transmitted via a communication-line. In short, the programs can be distributed as a computer readable computer program product assuming any of various modes including a recording medium and a carrier wave.

The structural features, the shapes, the dimensions and the positional relationships explained in reference to the embodiments above represent an approximate example provided to facilitate understanding and implementation of the present invention and the numerical values referred to above also represent examples. Accordingly, the present invention is not limited to the embodiments explained above and various modifications may be realized without departing from the scope of the technical concept of the present invention.

The invention claimed is:

1. A working machine maintenance system comprising:
a plurality of working machines; and
a center server that manages maintenance on the plurality of working machines by engaging in data exchange through bidirectional communication with each of the plurality of working machines via a communication line, wherein:
the working machines each include an operation data storage device that stores operation data and maintenance data, an operation device operated to enter a maintenance work completion, a data transmission device that transmits the operation data, maintenance work completion data provided through the operation device and the maintenance data to the center server, a data reception device that receives data related to maintenance information transmitted from the center server and a display device at which the maintenance information is displayed; and
the center server includes a data reception device that receives the operation data, the maintenance work completion data and the maintenance data that have been transmitted, an operation database in which the operation data are stored, a maintenance database in which the maintenance data are stored, a calculation device that calculates maintenance timing based upon the operation data stored in the operation database and the maintenance data stored in the maintenance database and a data transmission device that transmits data related to the maintenance information including the maintenance timing to a working machine.

2. A working machine maintenance system according to claim 1, wherein:
maintenance work, a completion of which is signaled through an input operation at the operation device, includes failure repair work; and
the maintenance data include failure location data indicating a failure location at the working machine.

* * * * *